D. A. Peloubet,
Chain Link & Bar.
No. 108,621.         Patented Oct. 25. 1870.
Fig. 1.
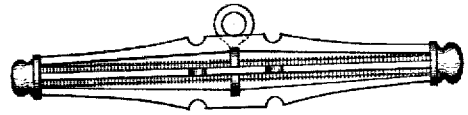
Fig. 2.
Fig. 3.
Fig. 4.    Fig. 5.    Fig. 6.
      
David A. Peloubet
Inventor.
Witnesses:
Thos. W. Thomas.
John G. Steele

United States Patent Office.

DAVID A. PELOUBET, OF HUDSON CITY, NEW JERSEY, ASSIGNOR TO WARREN, SPADONE & CO., OF NEW YORK CITY.

Letters Patent No. 108,621, dated October 25, 1870.

IMPROVEMENT IN CHAIN-LINKS AND BARS.

The Schedule referred to in these Letters Patent and making part of the same

*To all whom it may concern:*

Be it known that I, DAVID A. PELOUBET, of Hudson City, in the county of Hudson and State of New Jersey, have invented a new and useful Improvement in Gold Chain-Link and Bar; and I hereby declare the following to be a full and exact description of the same, reference being had to the annexed drawing, in which—

Figure 1 is a perspective view of a bar and link, made according to my invention.

Figure 2 is a longitudinal section of the same.

Figure 3 is a view of one of the sectional bars.

Figure 4 shows the slotted collet which holds the sectional bars in place upon a center support.

Figure 5 shows side and plan view of collars, which hold the ends and fit on the shoulders of the sectional bars.

Figure 6 shows similar views of the nut which screws on the end of the center support, and binds the whole together.

As heretofore made, the chain-links and bars for gold chains have been made by soldering the parts together. This is objectionable, for the reason that the solder is necessarily of a low degree of fineness, and the soldered parts soon tarnish. Besides, it is quite troublesome to solder the parts together in a durable and tasteful manner.

My invention enables one to entirely dispense with solder. Each part may be made separately, and then brought together, and easily united.

The mode of constructing a chain-link and bar, according to my invention, may be readily understood by inspecting the several figures in the drawing.

One of the sectional bars is shown in fig. 3. At each end is a shoulder. The slotted collet shown in fig. 4 is placed on the middle of the center support, as shown in figs. 1 and 2, and the bars placed in the slots on the circumference of the collet.

A collar or washer, such as shown in fig. 5, is then placed over the ends of the bars, so as to fit snugly against the shoulders.

The nut shown in fig. 6 is then screwed upon the ends of the center piece or support, so as to fit against the collar or washer, and bind the whole together, so as to form a complete link and bar, as shown in fig. 1.

The scale in the drawing is enlarged to about double the usual size, so as to exhibit more clearly the several parts.

Having thus described my invention,

What I claim, and desire to secure by Letters Patent of the United States, is—

1. The improved chain-link and bar, herein described, composed of a center support, collet and sectional bars, combined and held together substantially as set forth.

2. The combination of the center support, screw-nuts, and slotted collet, as set forth.

3. The combination of the sectional bars, with shoulders, the collars, and screw-nuts, substantially as set forth.

DAVID A. PELOUBET.

Witnesses:
THOS. W. THOMAS,
JOHN G. EBERLE.